(12) United States Patent
Haji

(10) Patent No.: US 8,449,670 B2
(45) Date of Patent: May 28, 2013

(54) COMPOSITION COMPRISING A PHOSPHATE BINDER AND ITS PREPARATION

(75) Inventor: Anas Haji, Brussels (BE)

(73) Assignee: Xexos Limited, Dublin (IE)

( * ) Notice: Subject to any disclaimer, the term of this patent is extended or adjusted under 35 U.S.C. 154(b) by 326 days.

(21) Appl. No.: 12/746,147

(22) PCT Filed: Dec. 4, 2007

(86) PCT No.: PCT/BE2007/000125
§ 371 (c)(1),
(2), (4) Date: Jun. 3, 2010

(87) PCT Pub. No.: WO2009/070854
PCT Pub. Date: Jun. 11, 2009

(65) Prior Publication Data
US 2010/0248571 A1    Sep. 30, 2010

(51) Int. Cl.
*C04B 35/16*    (2006.01)

(52) U.S. Cl.
USPC ......................................................... 106/600

(58) Field of Classification Search
USPC ......................................................... 106/600
See application file for complete search history.

(56) References Cited

U.S. PATENT DOCUMENTS 3,179,527 A * 4/1965 Vukasovich et al. ......... 106/690
3,923,525 A * 12/1975 Toeniskoetter et al. ...... 106/38.3

* cited by examiner

*Primary Examiner* — Paul Marcantoni
(74) *Attorney, Agent, or Firm* — Hovey Williams LLP

(57) ABSTRACT

An inorganic binder having calcium silicate sites which are connected the one with the other by alumina-silica phosphate bonds, whereby at least a portion of said alumina-silica bonds are alumina-silica phosphate bonds having a weight ratio $Al_2O_3/SiO_2$ ranging from 0.3:1 to 10:1, a weight ratio $Al_2O_3/P_2O_5$ ranging from 0.0005 to 0.04, and a weight ratio P/B ranging from 20:1 to 100:1, whereby the inorganic binder further includes a waterproof and/or water repellent silicon compound or mixture.

23 Claims, No Drawings

COMPOSITION COMPRISING A PHOSPHATE BINDER AND ITS PREPARATION

FIELD OF THE INVENTION

The present invention relates to a composition comprising an inorganic binder, most precisely to an inorganic phosphate binder.

THE PRIOR ART

Inorganic phosphate binder have already been proposed in the past.

For example in a previous patent application WO9903797 in the name of Metal Chemical and Haji Anas, a polymeric matrix is disclosed, said matrix comprising a binder formed by mixing an alkali metal silicate aqueous solution with a powder comprising silico-aluminous reactive raw materials. A polymerization time of more than one hour is however necessary for reaching a sufficient hardening of the matrix.

It has also been proposed in U.S. Pat. No. 6,139,619 to form a binder by mixing a water soluble silicate with a water soluble amorphous inorganic phosphate glass in an aqueous medium. The hardening of the binder requires the removal of water by a heat treatment.

In U.S. Pat. No. 4,375,551, an acid solution is prepared by mixing $Al_2O_3 \cdot 3H_2O$ with phosphoric acid, said acid solution being then mixed with calcium silicate. The so obtained binder has after hardening poor mechanical strength.

U.S. Pat. No. 4,504,555 discloses an inorganic resin formed by reacting a first liquid component containing a mono aluminum phosphate or a mono magnesium phosphate, with a second liquid component containing magnesium oxide and/or wollastonite and a dispersing agent. Inert filler can be added to the first or second component. The inert filler (particles not participating to the reaction) can be SiO2 particles. The product prepared by this reaction is a resin in which adjacent calcium silicate sites (wollastonite) bound by magnesium/aluminum phosphate bonds, not by alumina silica phosphate bonds.

U.S. Pat. No. 3,179,527 discloses a coating composition formulated by adding silica or lime to an acidic solution of aluminum phosphate. Calcium silicate is then added to the composition. As stated in column 2 of said patent, the effect of added silica depends from the particle size of the silica particles, fine silica particles forming open cracks, while coarser particles do not produce such cracks. The silica particles are therefore not dissolved, otherwise the particle size of the silica particle would have no influence on cracks. The silica is therefore used in this patent as filler. The use of silica in a prereacted composition is even not indispensable according to said patent, as it could be replaced by calcium silicate. Silica is therefore not participating in the formation of bond between two adjacent calcium silicate particles. The compositions of this patent have a long shelf stability, meaning that the hardening reaction is a slow process.

U.S. Pat. No. 3,923,525 discloses a foundry composition containing a foundry aggregate and a binder comprising a boron-containing aluminum phosphate, a material containing both an alkaline earth metal and an oxide, and water. As disclosed in said document, the preferred aluminum phosphates contain from 3 to 30 mole % of boron. The boron containing aluminum phosphates are prepared by reacting together the phosphoric acid or $P_2O_5$, alumina, and boric acid or boric oxide. The addition of boric acid or boron additive is said to alter the reactivity of the aluminum phosphate with the alkaline earth material, especially for boron concentration above 10 mole % with respect to the moles of aluminum. The preferred alkaline earth metal have a surface area of less than 8.5 $m^2$/g and are for example calcium silicate, calcium aluminate, magnesium silicate, etc. A particularly preferred calcium silicate is wollastonite with a calcium oxide to silica mole ratio equal to about 1.

When using reacting an acid alumina-silica phosphate solution having an $Al_2O_3/SiO_2$ weight ratio of about 0.5 and an $Al_2O_3/P_2O_5$ weight ratio greater than 0.08, with calcium silicate or wollastonite, the initial settling occurs in less than 10 minutes, meaning that the composition is not suitable for coating fabrics in view of the substantially immediate increase of viscosity. The reaction product is substantially no more fluid after less than about 4 minutes. Furthermore, the top coat of the layer was provided with some white particles probably due to problem of excessive carbonation.

It has now been found that by using an acid alumina-silica phosphate composition comprising boric acid and specific additive, it was possible to achieve an initial setting of more than 1 hour, advantageously more than 2 hours, especially more than 4 hours by controlling $Al_2O_3/P_2O_5$ weight ratio to less 0.04, while avoiding the carbonation problem or the problem of formation of an upper coat of particles.

The present invention has for subject matter a binder composition with a work time of more than 20 minutes at 20° C. at atmospheric pressure (1 $10^5$ Pa), and which can be adapted to the required work time, for example up to 6 hours or even more. Such a binder with long work time is advantageous for ensuring a good coating of various support, especially for having extremely thin coating layer.

The curing of the binder can however be accelerated by increasing the temperature above 50° C., rendering therefor the coating process quite easy.

Furthermore, it has been observe that before hardening, liquid composition comprising the binder of the invention was quite homogeneous and stable. The homogeneity of the composition can be improved with a slow mixing, such as a slow paddle mixing.

These specific properties have been obtained by using specific additives, and by using an acid alumina-boron-silica phosphate solution having a P/B weight ratio from 20:1 to 100:1 and a $Al_2O_3/P_2O_5$ weight ratio comprised between 0.0005 and 0.04.

Despite the fact that that U.S. Pat. No. 3,923,525 teaches that boric acid alters the reaction of aluminum phosphate with the alkaline earth material, the man skilled in the art was unable to predict that for acid alumina-silica phosphate solution, the reaction will only effectively delayed when having a large excess of phosphate with respect to alumina.

DESCRIPTION OF THE INVENTION

The Binder

The invention relates to an inorganic binder having calcium silicate sites which are connected the one with the other by alumina-silica phosphate bonds, whereby at least a portion of said alumina-silica phosphate bonds are alumina-boron-silica phosphate bonds, the calcium silicate sites acting as cross-linking sites for the alumina-silica phosphate bonds, whereby said alumina-silicate phosphate bonds have:

a weight ratio $Al_2O_3/SiO_2$ ranging from 0.3:1 to 10:1, advantageously from 0.4:1 to 6:1, preferably between 0.5:1 and 2:1, a weight ratio $Al_2O_3/P_2O_5$ ranging from 0.0005 to 0.04, advantageously from 0.0008 to 0.03, preferably from 0.001 to 0.02, and a weight ratio P/B ranging from 20:1 to 100:1, advantageously from 21:1 to 50:1, preferably from 22:1 to 30:1, and whereby the inorganic binder further comprises a waterproof and/or water repellent silicon compound or mixture, the weight ratio waterproof and/or water repellent silicon compound or mixture/P+B being comprised between 1:5000 and 1:10, advantageously between 1:1000 and 1:25, preferably between 1:500 and 1:75, and whereby at least a portion of the calcium silicate sites are at least partly provided with a layer of waterproof and/or water repellent silicon compound or mixture.

Said organic binder is defined as being the reaction product obtained by reacting an acid alumina-silica-boron phosphate solution having a pH of less than 2, advantageously less than 1.5, preferably less than 1, said acid alumina-silica phosphate solution having:

a weight ratio $Al_2O_3/SiO_2$ ranging from 0.3:1 and 10:1, advantageously from 0.4:1 to 6:1, preferably between 0.5:1 and 2:1, a weight ratio $Al_2O_3/P_2O_5$ ranging from 0.0005 to 0.04, advantageously from 0.0008 to 0.03, preferably from 0.001 to 0.02, and a weight boron content such that the weight ration P/B is comprised from 20:1 to 100:1, advantageously from 21:1 to 50:1, preferably from 22:1 to 30:1, with an amount of calcium silicate particles (advantageously such that the weight ratio calcium silicate site/$SiO_2$ present in the alumina-silica phosphate bonds is comprised between 1 and 1000, advantageously between 10 and 200, preferably between 20 and 100), in presence of an amount of waterproof and/or water repellent silicon compound or mixture such that the weight ratio waterproof and/or water repellent silicon compound or mixture/P+B being comprised between 1:5000 and 1:10, advantageously between 1:1000 and 1:25, preferably between 1:500 and 1:75, whereby said reaction is carried out optionally, but advantageously, in presence of one or more inert fillers.

The acid alumina-silica phosphate solution, before addition of the calcium silicate particles, has advantageously a low weight content in components selected from the group consisting of Fe, Ti, Zr, V, Cr, Mn, Zn, Na and mix thereof For example, the weight ratio components selected from the group consisting of Fe, Ti, Zr, V, Cr, Mn, Zn, Na and mix thereof/$Al_2O_3$ is lower than 1, advantageously less than 0.1, preferably less than 0.05.

Advantageously, the binder composition has a low weight content in components selected from the group consisting of Fe, Ti, Zr, V, Cr, Mn, Zn, Na and mix thereof, i.e. a weight ratio components selected from the group consisting of Na, Fe, Ti, Zr, V, Cr, Mn, Zn, and mix thereof/B of less than 1, preferably less than 0.5, most preferably less than 0.2.

The calcium silicate site are preferably particles responding substantially to the formula $CaO.SiO_2$ comprising a CaO weight content of more than 46%, a $SiO_2$ weight content of more than 52%, an $Al_2O_3$ weight content of more than 0.2%, a $Fe_2O_3$ weight content of less than 0.4%, a weight loss content when burned at 1000° C. of less than 0.5%.

Preferably at least 98% by weight, preferably at least 99% by weight of the binder is formed by the following atoms P, O, Si, Al, B and Ca.

Advantageously, substantially all alumina-silica sites are bound the one to the other by alumina-boron-silica phosphate bonds.

The calcium silicate sites act preferably as cross-linking sites for alumina-boron-silica phosphate bonds.

According to an embodiment, the weight ratio calcium silicate site/$SiO_2$ present in the alumina-silica phosphate bonds is comprised between 1 and 1000, advantageously between 10 and 200, preferably between 20 and 100.

According to an advantageous embodiment, the calcium silicate sites are calcium meta silicate sites having a substantially acicular nature with a length/diameter ratio from 2/1 to 50/1, advantageously from 3/1 to 20/1, the calcium meta silicate sites having advantageously an average length from 10 μm to 10 mm, preferably from 50 μm to 5 mm.

According to a specific embodiment, the weight ratio calcium silicate sites/alumina-silica-boron phosphate bonds is comprised between 0.1 and 1.1, advantageously between 0.3 and 0.9, preferably between 0.4 and 0.7.

Preferably, at least 50% by weight of the calcium silicate sites are at least partly provided with a layer of waterproof and/or water repellent silicon compound or mixture.

For example, calcium silicate sites are at least partly provided with a layer of waterproof and water repellent silicon compound or mixture, such as a layer of a fluoro silicon compound or mixture of such compounds.

Waterproof or water repellent silicon compound in the present specification refers to compounds suitable to make a coating or a partial coating which is water repellent or waterproof, said coating being very thin and comprising silicon. Such a coating or partial coating is achieved by using solvent based silicon solution and/or water-base emulsion of silicon compound. Preferably, use is made of a solvent base solution (dispersible in water) of one or more of the following silicon compounds: methylhydrogensilicone oil, dimethylsilicone oil, epoxy modified silicone oil, amino modified silicone oil, polyether modified silicone oil, carboxyl modified silicone oil, silanes (such as ether silanes, polyether silanes), siloxanes, silanols, and/or a water-base emulsion of one or more of the following silicon compounds: methylhydrogensilicone oil, dimethylsilicone oil, epoxy modified silicone oil, amino modified silicone oil, polyether modified silicone oil, carboxyl modified silicone oil, silanes, siloxanes, silanols.

For example, silane-containing aqueous solutions that can provide water-repellent characteristics on the surface of a substrate have been disclosed. See, e.g., U.S. Pat. Nos. 4,648, 904, 4,757,106, 4,990,377, 5,196,054, 5,550,184, and 5,664, 014, European Patent 0 748 357, Japanese Kokai Patent Application No. Hei 11(1999)-181355, and US2003212196.

For example, U.S. Pat. No. 5,550,184 discloses reactive hydrolyzed silane emulsions produced by emulsifying a hydrolyzable alkoxysilane in water in the presence of a high HLB value emulsifier to simultaneously retain the hydrolyzable alkoxysilane in substantially totally hydrolyzable state. The emulsion can produce durable coatings that impact water-repellent characteristics on a substrate.

The silicone and/or silane and/or siloxane partial coating of the calcium silicate is for example by using a solvent based silicone/silane/siloxane solution and/or a solvent free aqueous silicone and/or silane and/or siloxane emulsion or dispersion.

Water repellent compositions containing aqueous emulsions of silanes, siloxanes and silane/siloxanes for use on materials used in building to make them water repellant are disclosed in WO9516752.

Solvent base composition suitable for rendering at least partly a substrate (for example calcium silicate) water repellent is for example disclosed in WO 02/30848, U.S. Pat. No. 5,997,943, WO00/63129, U.S. Pat. No. 5,980,992, U.S. Pat. No. 5,415,927, EP548775, EP887394, etc.

Advantageously, the calcium silicate particles are only partly coated, for example from 5 to 75% of their surface.

According to an advantageous embodiment, the weight ratio waterproof and/or water repellent silicon compound or mixture/calcium silicate is comprised between 1:10000 and 500:10000, advantageously between 5:10000 and 200:10000, preferably between 10:10000 and 70:10000.

The binder of the invention is suitable for preparing product having a light weight (such a weight from 70 to 140 kg/m$^3$) or a heavy weight (such as weight of 2,000 kg/m$^3$ or even more). Products of the invention have high mechanical properties, such as compression strength of more than 40N/mm$^2$, bending strength of more than 10 N/mm$^2$, etc.

The invention relates also to a composition and a product comprising at least a binder according to the invention and at least one filler and/or reinforced material.

The invention relates also to composition comprising at least:

an inorganic binder according to the invention as disclosed here above, and one or more fillers, advantageously at least a silicon containing filler.

The compositions of the invention are composition before hardening, after hardening, possibly after an after treatment, such as a drying step, a heating step, etc.

Examples of fillers or reinforced materials which can be mixed with the binder before its preparation, during its preparation, before its hardening or during its hardening are:

waste materials, such as finely divided waste material, for example fuel ashes, fly ashes, buildings waste materials, etc.

flake-like materials such as mica, etc., silica sand, silica flour, coloring agents or materials, such as inorganic coloring agents, pigments, etc.

cellulose and/or protein base fibers, such as natural fibers, flax, chip, straw, hemp, wool fibers, etc.

synthetic fibers, such as organic synthetic fibers, inorganic synthetic fibers, such as polyesters, polypropylene, glass and ceramic fibers, etc.

natural and synthetic organic base waste materials, such as saw dust, rice husk, straw and recycled organic waste, natural fibers of mineral origin, natural material, possibly treated (for example heat treated), such as perlite, vermiculite, etc.

mixtures of one or more of the above fillers.

Specific examples of possible fillers are:

rice husk, waste recycle cardboard shredded paper rice husk/shredded paper composite rice husk+waste recycle cardboard pine needle laminated elements, such as honeycomb board, normal cardboard, etc.

pigments

The filler or fillers are advantageously substantially not reactive fillers, preferably not reactive silicon containing fillers, i.e. fillers characterized in that less than 10% by weight, advantageously less than 5% by weight, preferably less than 1% by weight, most preferably less than 0.5% by weight, of the filler or silicon containing fillers are chemically reacted with the binder, for making for example one or more chemical bonds between filler and the binder.

Silica containing fibers are for example natural fibers, possibly treated, synthetic fibers, mineral fibers, and mixtures thereof. Natural fibers are preferred, such as wood fiber, straw fiber, rice husk or bran fibers, mixtures thereof. The natural fibers are advantageously heat treated, for example at temperature higher than 400° C., such as at a temperature higher than 700° C. or 800° C., advantageously in an atmosphere rich in Nitrogen or in a nitrogen atmosphere. Said heat treatment is preferably carried after a drying step. Rice bran or rice husk are preferred silica containing fibers used in the composition of the invention, said fibers being advantageously defatted and dried. When said fibers are burned and carbonized in a nitrogen gas rice bran ceramic fiber are produced. Possibly some phenolic resin is added to the rice bran or rice husk before the carbonizing and burning step. Possibly the phenolic resin can be mixed with rice bran so as to prepare or form rice bran containing fibers or filaments, the latter fibers or filament after drying being carbonized and burnt (for example at a temperature of 300 to 1100° C. during a time sufficient for the formation of ceramics). The silica containing fibers are advantageously ceramic silica containing fibers, basalt containing fibers, carbon containing fibers, combinations thereof. Such fibers, especially rice bran ceramic fibers, have a high strength, a high hardness, a low density, a low friction (hereby the fibers can easily flow the one with respect to the other, whereby facilitating the mixing step).

Additives can be added to the binder before its preparation, during its preparation, before its hardening or during its hardening, such additives are for example:

foaming agents, such as water peroxide, organic peroxide, etc.

viscosity regulating agents, such as superplasticizer material for improving the impermeability or the water repulsion such as lignosulfonates and silica fume penetrating agents dispersing agents mixtures thereof The filler comprises advantageously silicon containing fibers with a weight average length of less than 1000 μm, advantageously comprised between 25 μm and 300 μm, preferably comprised between 50 μm and 250 μm.

For example, the composition comprises silicon containing fibers with a length of less than 1000 μm, the weight content of silicon containing fibers with a length of less than 1000 μm in the composition after its hardening and after removal of the possible free water being of at least 0.5%.

For example, the weight ratio calcium silicate particles/liquid acid alumina-boron-silica phosphate solution of the composition before its hardening, preferably before its setting is comprised between 0.1 and 10, preferably from 0.2 and 5, most preferably between 0.4 and 2.

According to a preferred embodiment, the silicon containing fibers with a length of less than 1000 μm are substantially not reactive with the binder.

According to a further advantageous embodiment, after hardening and removal of free water (free water is water present in the composition, such as in the hardened composition, but which can be removed in a drying step at a temperature of 100° C.), the composition comprises from 1% up to 85% by weight, advantageously from 2% to 75% by weight, preferably from 20% to 65% by weight, most preferably from 30% to 60% by weight silicon containing fibers with a length of less than 1000 μm, advantageously less than 500 μm, which are substantially not reactive with the binder.

The silica containing fillers, especially fibers, are advantageously treated with a water repellent agent, such as a water repellent coating of less than 10 μm. This coating is for example a fluoro silane coating.

It has been observed that the presence of at least 0.5% by weight, preferably at least 1% by weight of silicon containing fibers, advantageously silicon containing fibers non reactive with the binder or substantially non reactive with the binder, it was possible to prevent the formation of any cracks at the surface of the hardened composition, as well as advantageously in the body of the hardened composition, even if the hardened composition has a high thickness, such as a thickness of more than 2 mm, advantageously of more than 5 mm, such as a thickness comprised between 10 mm and 50 mm.

According to a further detail, the composition further comprises silica flour with a particle size of less than 500 μm, advantageously comprised between 2 and 400 μm, preferably comprised between 2 and 100 μm, most preferably between 5 and 60 μm, the weight content of silica flour in the composition after its hardening and after removal of the possible free water being of at least 0.5%, advantageously comprised between 1 and 10%, preferably comprised between 2 and 8%.

For example, the silica flour has an average (in weight) particle size comprised between 10 and 50 μm, the weight content of silica flour in the composition after its hardening and after removal of the possible free water being comprised between 2 and 8%.

According to a further advantageous detail, the composition further comprises crystallized alumina silicate particles which are substantially not reactive with the binder and which have an average (in weight) particle size comprised between 5 and 100 μm, the weight content of non reactive crystallized alumina silicate in the composition after its hardening and after removal of the possible free water being comprised between 1 and 10%.

The composition, as well as the binder of the invention can be used for attaching two elements together, i.e. as glue, heat resistant glue or sealant or for manufacturing products with various shapes.

The binder/composition of the invention is suitable for preparing product having a light weight (such a weight from 70 to 140 kg/m$^3$) or a heavy weight (such as weight of 2,000 kg/m$^3$ or even more), depending to the addition of fillers, additives, etc., such as foaming agents.

Products of the invention have high mechanical properties, such as one or more of the following properties (preferably several of said properties): compression strength of more than 40N/mm$^2$, bending strength of more than 10 N/mm$^2$, very low heat of combustion (less than 500 KJ/kg, advantageously less than 100 KJ/kg, method used: ASTM D 2015 and BS EN ISO 1716), a high modulus of rupture (such as more than 10 MPa, for example between 12 and 20 MPa, method of analysis: NBN EN 196-1), a high compressive strength (more than 50 MPa, such as from 70 to 100 MPa, method of analysis: NBN EN 196-1), a high Young's modulus (more than 5000 MPa, such as between 8000 and 15000 MPa, method of analysis: NBN EN 196-1), absence o swelling even for water absorption from 10% up to 30% depending of the porosity, etc.

Products of the invention can be used as insulating materials (as panels, sheets, granules, etc), fire protection material, heat protection material, chemical protection material, buildings material (such as bricks, concrete, etc.), for making molds, shaping, casting and moldings products, tiles, roofing sheet, coating layers, inner layer, laminated products, metallic profile, aluminum profile, steel profile, metal band or plate, flexible membrane, polyethylene web. Polymer layer (polyurethane, latex, etc.), etc. Specific examples are: roofing sheet, insulation panels, coating surface material Wear resistant tile, high strength building elements, fire and heat resistant elements, adhesive material, sealants, slates, laminated elements, joint compounds, refractory, mineral fibers, etc.

The invention relates also more precisely to a product made at least partly or associated at least partly to a hardened composition of the invention, as disclosed here above. For example the product can be a support provided with a coating layer with a thickness for example of 1 to 10 mm, or even more.

The product can also have the form of a laminated product, an inner layer being made from a composition of the invention, said inner layer having for example a thickness of 5 mm up to 100 mm, or even more.

According to an embodiment, the hardened layer covers at least partly a face of a support element. One or more faces of the support can be provided with a hardened layer. The thickness of the layer is advantageously lower than 10 mm, such as lower than 5 mm, such as 4 mm, 3 mm, 2 mm, 1 mm, 500 μm, 250 μm, 100 μm, depending on the properties which are required.

According to an advantageous embodiment, the hardened layer covers at least partly a face of a support comprising a core which can be subjected to a water swelling. It has been observed that by coating already one face of a plate (which can be subjected to a water swelling) with a composition of the invention, it was possible to obtain after hardening of the composition, a product which has a reduced swelling even after being dipped in water for 72 hours at 20° C. Tests made on commercial wood fiber composite material with a swelling of 37% after being dipped in water for 72 hours at 20° C., have shown that by providing one or more faces of the material with a thin hardened layer of the composition of the invention, it was possible to reduce the swelling to less than 10%, advantageously less than 6%, preferably less than 2%.

According to a specific embodiment, at least partly a face not covered by a hardened layer of the invention is provided with a water repellent coating, advantageously silicon containing water repellent coating, such as a fluoro silicon coating (fluoro silane, etc. such as fluorosilane marketed by 3M as water repellent agent, such as the product Scotchgard®).

The thickness of the water repellent coating is advantageously less than 500 μm, such as less than 250 μm, preferably less than 150 μm, most preferably less than 100 μm, for example less than 50 μm, or even lesser, such as less than 20 μm or even less than 10 μm.

According to a more specific embodiment, substantially all the faces not covered with the hardened layer are provided with a water repellent coating.

According to an embodiment, the support has two substantially parallel faces (top and bottom faces or major faces, front and rear faces) connected the one to the other by lateral faces, whereby said lateral faces (bottom/top or front/rear faces) have a higher water permeability than the two substantially parallel faces. In said embodiment, the lateral faces of the support are provided with a water repellent coating. The water repellent coating on said lateral faces covers also at least a portion of the front/rear faces along their edges or at least a portion of the hardened layer adjacent to the edges of said front and rear faces. The water repellent coating can be carried out before and/or after providing the support with the hardened layer of the invention.

The invention further relates also to a product comprising a support having at least one face at least partly coated with a composition according to the invention, as disclosed here above.

Advantageously, the hardened layer covers at least partly a face of a support comprising a core which can be subjected to a water swelling, whereby at least partly a face not covered by hardened layer is provided with a water repellent coating.

The water repellent coating is advantageously a silicon containing water repellent coating.

According to an embodiment, the support is a fabric, advantageously a glass fabric with a weight from 50 g/m² to 500 g/m², at least one face thereof being at least partly coated with a layer of a composition according to anyone of the claims 9 to 16, said layer having an average thickness of less than 500 μm, advantageously comprised between 50 μm and 250 μm.

The invention further relates to a process for the preparation of an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1,

* in which water insoluble calcium silicate particles, possibly partly coated with a waterproof and/or water repellent silicon compound or mixture, are mixed with an acid alumina-silica phosphate solution comprising boric acid and waterproof and/or water repellent silicon compound or mixture, at a temperature lower than 70° C., advantageously lower than 50° C., said acid alumina-silica phosphate solution comprising solubilized $SiO_2$ and having a pH of less than 2, advantageously less than 1.5, preferably less than 1, said acid alumina-silica phosphate solution having:

a weight ratio $Al_2O_3/SiO_2$ ranging from 0.3:1 and 10:1, advantageously from 0.4:1 to 6:1, preferably between 0.5:1 and 2:1, a weight ratio $Al_2O_3/P_2O_5$ ranging from 0.0005 to 0.04, advantageously from 0.0008 to 0.03, preferably from 0.001 to 0.02, and a weight boron content such that the weight ration P/B is comprised from 20:1 to 100:1, advantageously from 21:1 to 50:1, preferably from 22:1 to 30:1, and said acid alumina-silica phosphate comprising an amount of waterproof and/or water repellent osilicon compound or mixture such that the weight ratio waterproof and/or water repellent silicon compound or mixture/P+B being comprised between 1:5000 and 1:10, advantageously between 1:1000 and 1:25, preferably between 1:500 and 1:75, and whereby at least a portion of the calcium silicate sites are at least partly provided with a layer of waterproof and/or water repellent silicon compound or mixture, or

* in which water insoluble calcium silicate particles partly coated with a layer of waterproof and/or water repellent silicon compound or mixture are mixed with an acid alumina-silica phosphate solution comprising boric acid and possibly waterproof and/or water repellent silicon compound or mixture, at a temperature lower than 70° C., advantageously lower than 50° C., said acid alumina-silica phosphate solution comprising solubilized $SiO_2$ and having a pH of less than 2, advantageously less than 1.5, preferably less than 1, said acid alumina-boron-silica phosphate solution having:

a weight ratio $Al_2O_3/SiO_2$ ranging from 0.3:1 and 10:1, advantageously from 0.4:1 to 6:1, preferably between 0.5:1 and 2:1, a weight ratio $Al_2O_3/P_2O_5$ ranging from 0.0005 to 0.04, advantageously from 0.0008 to 0.03, preferably from 0.001 to 0.02, and a weight boron content such that the weight ration P/B is comprised from 20:1 to 100:1, advantageously from 21:1 to 50:1, preferably from 22:1 to 30:1, and whereby the amount of waterproof and/or water repellent silicon compound or mixture coating the water insoluble calcium silicate particles, possibly with the waterproof and/or water repellent silicon compound or mixture present in the solution is such that the weight ratio waterproof and/or water repellent organic silicone and/or silane and/or siloxane/P+B being comprised between 1:5000 and 1:10, advantageously between 1:1000 and 1:25, preferably between 1:500 and 1:75, and whereby at least a portion of the calcium silicate sites are at least partly provided with a layer of waterproof and/or water repellent silicon compound or mixture.

The acid pH of the acid alumina-boron-silica-phosphate solution is advantageously obtained by using phosphoric acid or an acid mixture containing at least phosphoric acid and boric acid. Preferably, substantially only a mix of phosphoric acid and boric acid is used as mineral acid, most preferably as acids for lowering the pH of the solution to less than 2.

Advantageously, at least one filler is added to the binder before its hardening or to the reacting solution for making a binder or to the calcium silicate to be reacted with the acid alumina-silica-phosphate solution or to the acid alumina-silica-phosphate solution before adding the calcium silicate particles.

According to various embodiments, the compounds used in the preparation process are used in an amount adapted for the preparation of a binder or composition of the invention with one or more specific characteristics or details.

Advantageously, the hardening of the binder is carried out at a temperature comprised between 0° C. and 50° C., optionally under pressure.

According to a detail, the amount of calcium silicate added to the acid silica alumina phosphate solution is such that the weight ratio calcium silicate/$SiO_2$ present in the acid solution is comprised between 1 and 5, advantageously comprised between 1.5 and 3.5, preferably between 2 and 3.

According to a further detail of an embodiment, the acid silica alumina phosphate solution is prepared by mixing a silica-alumina mixture with an acid mixture consisting substantially only of phosphoric acid and boric acid, with a weight ratio P/B ranging from 20:1 to 100:1, advantageously from 21:1 to 50:1, preferably from 22:1 to 30:1.

According to still a further detail, the acid silica alumina phosphate solution is prepared by mixing a silica-alumina mixture with a boron salt and an acid selected from the group consisting of phosphoric acid and a mix of phosphoric acid and boric acid, whereby the weight ratio P/B of the so prepared acid alumina phosphate solution ranges from 20:1 to 100:1, advantageously from 21:1 to 50:1, preferably from 22:1 to 30:1.

According to a further detail, the acid silica alumina phosphate solution is prepared by mixing silica particles with an acid consisting substantially only of phosphoric acid or of a mixture of phosphoric acid and boric acid, and by mixing thereafter said particles to the acid silica containing solution alumina particles.

In the process of the invention, a filler and/or a reinforced material is advantageously mixed with the calcium silicate particles before being mixed with the acid alumina-silica phosphate solution and/or a filler and/or a reinforced material is mixed to the mixture calcium silicate/alumina—silica phosphate solution, before or during its hardening.

The binder of the invention is prepared by using an acid alumina-silica phosphate solution, said solution is advantageously prepared by reacting aluminum oxide powder (size advantageously lower than 50 μm, preferably lower than 30 μm, for example from 5 to 25 μm) with a purity of more than 95%, preferably more than 99%, silica powder (size advantageously lower than 50 μm, preferably lower than 30 μm, for example from 10 to 25 μm) with a purity of more than 95%, preferably of more than 99%, and phosphoric acid as an aqueous phosphoric acid or in presence of an aqueous medium. The phosphoric acid has preferably a purity of more than 95%, most preferably of more than 99%. Phosphoric acid is available in various concentration. Preferably, the phosphoric acid will be a phosphoric aqueous solution with a phosphoric acid concentration of more than 75%, preferably of more than 85%. Preferably, the silica powder is first mixed with the phosphoric acid and then the alumina particles are added.

The acid alumina-silica phosphate solution contains possibly some other acids, such as organic acid, strong mineral acid, etc, however, in this case, the content of such acid will preferably be less than 10% of the phosphoric acid and boric acid content of the solution.

Instead of using aluminum oxide, it is possible to use aluminum phosphate, aluminum hydroxide, etc. However, aluminum oxide is preferred.

Instead of using silica, preferably precipitated silica particles, it is possible to use waste material issuing from glass bottles.

Possibly the aqueous phosphoric acid solution contains other solvents, such as alcohol, etc.

When a foamed product is desired, more water or solvent will be used for decreasing as much as possible the viscosity.

The acid alumina-boron-silica phosphate solution has advantageously a pH lower than 2, preferably lower than 1.

The acid alumina-boron-silica phosphate solution is advantageously filtered so as to remove possibly not dissolved particles.

It has been observed that when using silica particles for the preparation of the acid alumina-boron-phosphate solution with a pH lower than 2, most preferably lower than 1, the dissolution of alumina particles was improved. The presence of solubilized $SiO_2$ in the acid solution was also improving the formation of the bonds when adding the water insoluble calcium silicate particles. Even, if some calcium silicate particles are solubilized due to the low pH, some calcium silicate particles remains insoluble, due for example to the increase of pH to a value comprised between 3 and 6.

According to a specific embodiment, the process for the preparation of a composition according to the invention is a process, in which a binding mixture is prepared by mixing water insoluble calcium silicate particles with an acid alumina-silica phosphate solution at a temperature lower than 50° C., said acid alumina-silica phosphate solution comprising solubilized $SiO_2$ and having a pH less than 2, advantageously less than 1.5, preferably comprised between 0.5 and 1.5, said alumina-boron-silica phosphate solution having a weight ratio $Al_2O_3/SiO_2$ ranging advantageously from 0.3:1 and 10:1, preferably from 0.6:1 and 6:1, in which silicon containing fibers with a length of less than 1000 µm are mixed with water insoluble calcium silicate particles, prior to or during the mixing of water insoluble silicate particles with an acid alumina-silica phosphate solution and/or in which silicon containing fibers with a length of less than 1000 µm are mixed with the binding mixture before its complete hardening.

Preferably, the binding mixture is first prepared and then the silicon containing fibers are added. Said addition is carried out when the binding mixture is still sufficiently liquid or pourable by gravity. Possibly before and/or during the addition of the fibers, water can be added for controlling the viscosity. Possibly the silicon containing fibers are prewetted before being added to the binding mixture.

According to an advantageous embodiment, silica flour is added to the water insoluble calcium silicate particles, prior to or during the mixing of water insoluble silicate particles with an acid alumina-silica phosphate solution and/or to the binding mixture before its complete hardening, said addition being carried out prior, during or after the addition of silicon containing fibers.

Preferably, the silicon containing fibers and the silica flour are premixed before being added to the acid alumina-boron-silica phosphate solution or to the binding mixture.

According to a possible embodiment, the insoluble calcium silicate particles, the silicon containing fibers and the silica flour are premixed before being added to and mixed with the acid alumina-boron-silica phosphate solution.

Advantageously, the weight ratio water insoluble calcium silicate particles/solubilized $SiO_2$ present in the alumina-silica phosphate solution is greater than 10, preferably greater than 20.

Preferably, the hardening of the binder/composition is carried out at a temperature comprised between 0° C. and 50° C., such as advantageously between 10 and 30° C. Higher temperature can be applied for initiating the reaction and/or for speeding the hardening.

The binder/composition is preferably hardened under pressure, such as under a pressure comprised between $2\ 10^5$ Pa and $100\ 10^5$ Pa, for example $5\ 10^5$ Pa, $10^6$ Pa, $2\ 10^6$ Pa, etc. When making thin coating layer on a support, such as a fabric, a glass fabric, fiber mat, a mat of glass fibres, etc. the hardening can be carried out between two moving supports, such as transport bands.

The amount of calcium silicate added to the acid silica-boron-alumina-phosphate solution is advantageously such that the weight ratio calcium silicate/$SiO_2$ present in the acid solution is comprised between 10 and 1000, advantageously comprised between 20 and 500.

According to a preferred embodiment, the silica used for the preparation of the acid silica alumina-boron-phosphate solution is precipitated silica.

The acid alumina-silca solution before its mixing with insoluble calcium silicate particles has advantageously a pH of less than 2, preferably less than 1.5, for example comprised between 0.1 and 1.5, preferably comprised between 0.5 and 1.5. The acid pH is advantageously obtained by using phosphoric acid or an acid mixture containing at least phosphoric acid and boric acid. Preferably, substantially only phosphoric acid, possibly with boric acid is used as mineral acid, most preferably as acid for lowering the pH of the solution to less than 2.

The calcium silicate particles are advantageously calcium meta silicate particles having a substantially acicular nature with a length/diameter ratio from 2/1 to 50/1, advantageously from 3/1 to 20/1.

The calcium meta silicate particles have preferably an average length from 10 µm to 10 mm, advantageously from 50 µm to 5 mm.

According to a preferred embodiment, the calcium silicate particles act as cross-linking sites for alumina-silica phosphate bonds. It seems also that the presence of insoluble calcium silicate particles catalyzes the formation of alumina-silica phosphate bonds.

The calcium silicate particles are advantageously at least partly coated with a water repellent layer or a waterproof layer, advantageously a water proof layer of silicon compound or mixture or a water repellent layer of silicon compound or mixture, said very thin layer coating for example only a portion of the calcium silicate particles.

In the process of the invention, the alumina-silica phosphate solution has advantageously a weight ratio $Al_2O_3/SiO_2$ ranging from 0.3:1 and 10:1, preferably from 0.6:1 and 6:1.

For example, the weight ratio calcium silicate particles/alumina-silica-boron phosphate solution is comprised between 0.1 and 10, preferably from 0.2 and 5, most preferably between 0.4 and 2.

In the process of the invention, various filler and/or a reinforced material can be mixed with the calcium silicate particles before being mixed with the acid alumina-silica phosphate solution, and/or a filler and/or a reinforced material is mixed to the mixture calcium silicate/alumina—silica phosphate solution, before its or during its hardening.

Examples of fillers or reinforced materials which can be mixed with the binder before its preparation, during its preparation, before its hardening or during its hardening are:

waste materials, such as finely divided waste material, for example fuel ashes, fly ashes, buildings waste materials, etc.

flake-like materials such as mica, etc., silica sand, silica flour, coloring agents or materials, such as inorganic coloring agents, pigments, etc.

cellulose and/or protein base fibers, such as natural fibers, flax, chip, straw, hemp, wool fibers, etc.

synthetic fibers, such as organic synthetic fibers, inorganic synthetic fibers, such as polyesters, polypropylene, glass and ceramic fibers, etc.

natural and synthetic organic base waste materials, such as saw dust, rice husk, straw and recycled organic waste, natural fibers of mineral origin, natural material, possibly treated (for example heat treated), such as perlite, vermiculite, etc.

basalt containing fibers, carbon containing fibers, etc.

combinations thereof

.etc.

Additives can be added to the binder/composition before its preparation, during its preparation, before its hardening or during its hardening, such additives are for example (examples given as example only):

foaming agents, such as water peroxide, organic peroxide, etc.

viscosity regulating agent, such as superplasticizer material for improving the impermeability or the water repulsion such as lignosulfonates silica fume penetrating agents, suspension agents, mixtures thereof.

Possibly, additives or fillers can be added during or after the hardening, for example for making a top coat.

The binder/composition of the invention is prepared by using an acid alumina-silica phosphate solution, said solution is advantageously prepared by reacting aluminum oxide powder (size advantageously lower than 50 µm, preferably lower than 30 µm, for example from 5 to 25 µm) with a purity of more than 95%, preferably more than 99%, silica powder (size advantageously lower than 50 µm, preferably lower than 30 µm, for example from 10 to 25 µm) with a purity of more than 95%, preferably of more than 99%, and phosphoric acid as an aqueous phosphoric acid or in presence of an aqueous medium. The phosphoric acid has preferably a purity of more than 95%, most preferably of more than 99%. Phosphoric acid is available in various concentration. Preferably, the phosphoric acid will be a phosphoric aqueous solution with a phosphoric acid concentration of more than 75%, preferably of more than 85%. Preferably, the silica powder is first mixed with the phosphoric acid and then the alumina particles are added.

The acid alumina-silica phosphate solution contains possibly some other acids, such as organic acid, strong mineral acid, etc, however, in this case, the content of such acid will preferably be less than 10% of the phosphoric acid content of the solution.

Instead of using aluminum oxide, it is possible to use aluminum phosphate, aluminum hydroxide, etc. However, aluminum oxide is preferred.

Instead of using silica, preferably precipitated silica particles, it is possible to use waste material issuing from glass bottles.

Possibly the aqueous phosphoric acid solution contains other solvents, such as alcohol, etc.

When a foamed product is desired, more water or solvent will be used for decreasing as much as possible the viscosity. It is also possible to obtain a foaming product by applying the acid composition on a base containing support or on an alkaline support.

The acid alumina silica-boron-phosphate solution has advantageously a pH lower than 2, preferably lower than 1.

It has been observed that when using silica particles for the preparation of the acid alumina-boron-phosphate solution with a pH lower than 2, most preferably lower than 1, the dissolution of alumina particles was improved. The presence of solubilized $SiO_2$ in the acid solution was also improving the formation of the bonds when adding the water insoluble calcium silicate particles. Even, if some calcium silicate particles are solubilized due to the low pH, some calcium silicate particles remains insoluble, due for example to the increase of pH to a value comprised between 3 and 6.

EXAMPLES

Details and characteristics of the invention will appear from the description of the following examples.

In said examples, the following products have been used:

WATER: water with a low calcium/magnesium content (less than 100 ppm)

$SiO_2$: precipitated $SiO_2$ particles with an average size of 10-15 µm—purity of 99%

$Al_2O_3$: powder with an average particle size of 10-15 µm—purity of 99%

Phosphoric acid P1: aqueous solution containing 90% by weight phosphoric acid

Phosphoric acid P2: aqueous solution containing 75% by weight phosphoric acid.

Calcium silicate: calcium meta silicate powder, water insoluble, acicular nature, length of 1 mm, diameter 100 µm.

Rice Husk fibers (RHF1): dried natural fibers (water content less than 2%) with an average (in weight) length of about 100 µm.

Rice Husk fibers (RHF2): dried natural fibers (water content less than 2%) with an average (in weight) length of about 200 µm.

Rice bran ceramic fiber (RBCF1): defatted bran mixed with phenolic resin, shaped in filament, dried and carbonized and burnt under nitrogen atmosphere at 800° C., the fibers having a length of about 100 µm.

Rice bran ceramic particles (RBC): defatted bran mixed with phenolic resin, powdered, dried and carbonized and burnt under nitrogen atmosphere at 800° C., the powder having an average particle size (average in weight) of about 50 µm.

Crystallized alumina silicate (CAS): not reactive with the phosphate solution, the particles having an average particle size of 50 µm (average in weight).

Silica Flour (SF): average (in weight) particle size of about 30 µm

Silica fume (Sf): average (in weight) particle size 50 µm.

Glass fiber (GF): glass fibres with a length of 50 μm to 250 μm, which have been treated with a water repellent agent (fluoro silane)

Basalt fiber (BF): Basalt fiber with a length of 50 μm to 250 μm

Carbon fibers (CF): Carbon fibers with a length of 50 μm to 250 μm

Water repellent silane/siloxane WRS1: a liquid solvent free aqueous based silane/siloxane solution containing 1.5% by weight silane/siloxane prepared from Dow Corning® 520 Dilutable water repellent emulsion Water repellent silane/siloxane WRS2: a low VOC aqueous silicone water repellent composition diluted with water so as to contain 1.5% by weight silicone compound (prepared from the composition Dow Corning® IE-6694)

Water repellent fluoro silane WRS3: an ethanol composition comprising 1.5% by weight of silane ether of the formula $CF_3$—$(CF_2)_7$—$(CH2)_2$—$Si$—$(OCH_3)_3$ Examples of Binders The binders have been prepared by adding $SiO_2$ particles to phosphoric acid. After dissolution of the $SiO_2$ particles, $Al_2O_3$ particles were added. An acid alumina silica phosphate aqueous solution was so prepared. Thereafter boric acid was added and optionally water repellent composition was further added. The pH of said acid solution was then measured at 20° C. Possibly some water was added.

To said acid solution, calcium silicate particles was added. Before hardening of the composition of the invention, the composition was fluid. After the addition of calcium silicate particles, the hardening of the binder can be started, but said starting could be delayed at room temperature, and even better at temperature from 0° C. to 10° C. Said hardening can however be accelerated at temperature higher than about 50° C. In order to control the viscosity of the mixture, water can be added. The initial setting time of the composition at room temperature was measured, said initial setting time could be considered as the time required for the start of the hardening reaction.

In some tests, the calcium silicate particles were first treated with the water repellent composition, before being added to the acid alumina-boron-silica phosphate solution.

The initial setting of the binder has been measured.

The following tables give the composition of the binders prepared.

TABLE 1

| Binder | 1 | 2 | comparative 3 | comparative 4 | 5 | 6 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 99% (g) | 75 | 74 | 59 | 56 | 75 | 75 |
| boric acid (g) | 6 | 6 | 6 | 6 | 6 | 4 |
| water (ml) | 25 | 25 | 25 | 25 | 30 | 15 |
| WRS1 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS1 is the amount in gram of water repellent solution including the water present
WRS/P + B is the weight ratio between the water repellent silicon compound (i.e. the active agent present in the solution) and the sum of phosphorus and boron present in the solution.

TABLE 2

| Binder | 7 | 8 | comparative 9 | comparative 10 | 11 | 12 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 99% (g) | 75 | 74 | 59 | 56 | 75 | 75 |
| boric acid (g) | 6 | 6 | 6 | 6 | 6 | 4 |
| water (ml) | 25 | 25 | 25 | 25 | 30 | 15 |
| WRS2 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS2 is the amount in gram of water repellent solution including the water present
WRS/P + B is the weight ratio between the water repellent silicon compound (i.e. the active agent present in the solution) and the sum of phosphorus and boron present in the solution.

TABLE 3

| Binder | 13 | 14 | comparative 15 | comparative 16 | 17 | 18 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 99% (g) | 75 | 74 | 59 | 56 | 75 | 75 |
| boric acid (g) | 6 | 6 | 6 | 6 | 6 | 4 |
| water (ml) | 25 | 25 | 25 | 25 | 30 | 15 |
| WRS3 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS2 is the amount in gram of water repellent solution including the water present
WRS/P + B is the weight ratio between the water repellent silicon compound (i.e. the active agent present in the solution) and the sum of phosphorus and boron present in the solution.

TABLE 4

| Binder | 19 | 20 | comparative 21 | comparative 22 | 23 | 24 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 75% (g) | 100 | 98 | 79 | 75 | 100 | 100 |
| boric acid (g) | 6 | 6 | 6 | 6 | 6 | 4 |
| water (ml) | 0.5 | 2 | 9 | 11 | 0 | 5 |
| WRS1 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS1 is the amount in gram of water repellent solution including the water present
WRS/P + B is the weight ratio between the water repellent silicon compound (i.e. the active agent present in the solution) and the sum of phosphorus and boron present in the solution.

TABLE 5

| Binder | 25 | 26 | comparative 27 | comparative 28 | 29 | 30 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 75% (g) | 100 | 98 | 79 | 75 | 100 | 100 |
| boric acid (g) | 6 | 6 | 6 | 6 | 6 | 4 |
| water (ml) | 0.5 | 2 | 9 | 11 | 0 | 5 |
| WRS2 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS2 is the amount in gram of water repellent solution including the water present
WRS/P + B is the weight ratio between the water repellent silicon compound (i.e. the active agent present in the solution) and the sum of phosphorus and boron present in the solution.

TABLE 6

| Binder | 31 | 32 | comparative 33 | comparative 34 | 35 | 36 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 75% (g) | 100 | 98 | 79 | 75 | 100 | 100 |
| boric acid (g) | 6 | 6 | 6 | 6 | 6 | 4 |
| water (ml) | 0.5 | 2 | 9 | 11 | 0 | 5 |
| WRS3 (g) | 15 | 15 | 15 | 15 | 10 | 25 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| pH of the acid solution | <1 | <1 | <1 | <1 | <1 | <1 |
| initial setting time (hour) | >40 | >3 | <0.2 | <0.2 | >20 | >40 |
| WRS/P + B | 0.01 | 0.01 | 0.012 | 0.012 | 0.006 | 0.015 |

The ratio P/B, $SiO_2/P_2O_5$, $Al_2O_3/SiO_2$, $Al_2O_3/P_2O_5$ are weight ratio for the acid solution (before addition of the calcium silicate particles).
WRS2 is the amount in gram of water repellent solution including the water present
WRS/P + B is the weight ratio between the water repellent silicon compound (i.e. the active agent present in the solution) and the sum of phosphorus and boron present in the solution.

TABLE 7

| Binder | 37 | 38 | comparative 39 | comparative 40 | 41 | 42 |
|---|---|---|---|---|---|---|
| $SiO_2$ (g) | 0.15 | 1.45 | 7.25 | 8.7 | 1 | 1 |
| $Al_2O_3$ (g) | 0.08 | 0.8 | 4 | 4.6 | 0.53 | 0.53 |
| Phosphoric acid 99% (g) | 75 | 74 | 59 | 56 | 75 | 75 |
| boric acid (g) | 6 | 6 | 6 | 6 | 6 | 4 |
| water (ml) | 25 | 25 | 25 | 25 | 30 | 15 |
| $SiO_2/P_2O_5$ | 0.002 | 0.018 | 0.158 | 0.198 | 0.018 | 0.018 |
| $Al_2O_3/SiO_2$ | 0.53 | 0.53 | 0.53 | 0.53 | 0.53 | 0.53 |
| $Al_2O_3/P_2O_5$ | 0.001 | 0.01 | 0.084 | 0.105 | 0.01 | 0.01 |
| P/B | 24 | 23 | 18 | 17.6 | 24 | 36 |
| Calcium silicate (g) | 60 | 60 | 60 | 60 | 60 | 60 |
| WRS1 (g) | 15 | 15 | 15 | 15 | 10 | 25 |
| pH of the acid solution | <1 | <1 | <1 | <1 | <1 | <1 |
| initial setting time (hour) | >50 | >5 | <0.2 | <0.2 | >30 | >50 |
| WRS/P + B | 0.01 | 0.01 | 0.012 | 0.012 | 0.006 | 0.015 |

The calcium silicate particles were pretreated with the WRS1 solution, prior to be added to the acid alumina-boron-silica phosphate solution.
The ratio P/B, $SiO_2/P_2O_5$, $Al_2O_3/SiO_2$, $Al_2O_3/P_2O_5$ are weight ratio for the acid solution (before addition of the calcium silicate particles).
WRS1 is the amount in gram of water repellent solution including the water present
WRS/P + B is the weight ratio between the water repellent silicon compound (i.e. the active agent present in the solution) and the sum of phosphorus and boron present in the solution.

Examples of Compositions of the Invention

The binders n° 1, 7, 11, 12, 17, 18, 24, 30, 35, 41 and 42 which remain liquid for more than 20 hours at room temperature were mixed with various additives and/or filler.
The following tables gives the different additives and fillers used, expressed in part by weight, the binder being expressed as dry matter (without water).

TABLE 8

| Product n° | 1 | 2 | 3 | 4 | 5 | 6 | 7 | 8 |
|---|---|---|---|---|---|---|---|---|
| Binder (dry matter, part by weight) | 1 | 1 | 1 | 1 | 1 | 1 | 1 | 1 |
| RHF1 | 0.1 | 0.1 | | | 0.5 | | | |
| RHF2 | | 0.1 | | | | | | |
| RBCF1 | | | 0.2 | | | 0.4 | 0.4 | 0.4 |
| RBC | | | | 0.3 | | | | |
| CAS | | | | | 0.2 | | | |
| SF | 0.02 | 0.02 | 0.05 | 0.05 | 0.1 | 0.1 | 0.1 | 0.1 |
| Sf | | | | | | 0.1 | 0.2 | 0.2 |
| GF | | | | | | | 0.5 | 1 |

TABLE 8-continued

| Product n° | 9 | 10 | 11 | 12 | 13 | 14 | 15 | 16 |
|---|---|---|---|---|---|---|---|---|
| Binder (dry matter, part by weight) | 1 | 1 | 1 | 1 | 1 | 1 | 1 | 1 |
| RHF1 | 0.1 | 0.1 | | | | 0.5 | | |
| RHF2 | | 0.1 | | | | | | |
| RBCF1 | | | | 0.2 | | | 0.4 | 0.4 | 0.4 |
| RBC | | | | | 0.3 | | | |
| CAS | | | | | | 0.2 | | |
| SF | 0.02 | 0.02 | 0.05 | 0.05 | 0.1 | 0.1 | 0.1 | 0.1 |
| Sf | 0.1 | 0.1 | 0.1 | | | 0.1 | 0.2 | 0.2 |
| GF | | | | | 0.5 | 0.5 | 1 | 0.2 |
| BF | 0.5 | 1 | | 0.5 | 0.5 | 0.5 | | 1 |
| CF | | | 0.5 | 0.5 | 0.5 | | 0.2 | |

| Product n° | 17 | 18 | 19 | 20 | 21 | 22 |
|---|---|---|---|---|---|---|
| Binder (part by volume) | 1 | 1 | 1 | 1 | 1 | 1 |
| Additive (Part by volume) | $H_2O_2$ 0.13 | Silica Fume 0.42 | Aluminum powder 0.12 | Super Plasticizer 0.15 | Ligno-Sulfonate 0.13 | Quartz 0.54 |
| Filler (part by volume) | Vermiculite 0.33 | Straw 3 parts | Fly ash 0.52 | Chip 1.22 | Flax Fiber 0.75 | Silica Flour 0.25 |
| Appearance of the product | Foam, low density | Low density | Foam Low density | Low density | Low density | Heavy density |

For the preparation of said compositions, water can be added for controlling the viscosity of the composition, said viscosity being preferably maintained as low as possible during the mixing step.

To the compositions of Table 8, one or more further additives or fillers can be added.

The following table gives possible additives and fillers which can be added to the compositions of the table 8. Said addition is carried out when the composition is sufficient liquid. Possibly some water is added before the addition and/or during the addition of said additives and fillers.

TABLE 10

Examples of possible additive and filler added to one volume of a composition with a solid content of 25% and 50% by weight

| Additive (Part by volume) | $H_2O_2$ 0.13 | Silica Fume 0.42 | Aluminum powder 0.12 | Super Plasticizer 0.15 | Ligno-Sulfonate 0.13 | Quartz 0.54 |
|---|---|---|---|---|---|---|
| Filler (part by volume) | Vermiculite 0.33 | Straw 3 parts | Fly ash 0.52 | Chip 1.22 | Flax Fiber 0.75 | Silica Flower 0.25 |
| Appearance of the product | Foam, low density | Low density | Foam Low density | Low density | Low density | Heavy density |

The composition comprising one or more inert fillers are preferably prepared by premixing at least partly the inert fillers with the calcium silicate, before using said calcium silicate for the preparation of the binder. The premix was thus mixed with the acid silica alumina boron phosphate solution.

For accelerating the curing or hardening of the composition, heat was applied.

Examples of Coating Operation

A wood board with a thickness of 20 mm has been cut in samples with a size of 200 mm×200 mm. One sample was used as control sample. Said control sample was dipped in water at 20° C. for 72 hours. The water absorption of the control sample was 46% (i.e. the weight of the wood board was increased by 46% due to the dipping in water, with respect to the weight of the dry board before its dipping dry meaning a water content of less than 10% by weight in the board), while the swelling of the product was 37% (i.e. the volume of the sample was increased by 37% due to the dipping with respect to the volume of the dry board—dry meaning a water content of less than 10% by weight), The samples have been submitted respectively to the following treatment.

Sample 1

Composition 7 of Table 1 has been used just after its preparation for coating the upper face of sample. The coating after drying had a thickness of 2 mm.

After its complete curing, the sample was dipped in water (20° C.) for 72 hours. The water absorption was about 25% with a swelling of about 8%.

Sample 2

Sample 2 was prepared as disclosed for sample 1, except that after coating the front face, the rear face was also coated with a mm thick coating (composition 7 of Table 1).

After its complete curing of the two coating layer, the sample was dipped in water (20° C.) for 72 hours. The water absorption was about 20% with a swelling of about 6%.

Sample 3

Sample 3 was prepared as disclosed for example 2, except that thereafter the four lateral faces of the sample were also provided with a coating layer (composition 7), said layer having a thickness of about 1-2 mm.

After complete curing or hardening of the coating layer, the sample was dipped in water (20° C.) for 72 hours. The water absorption was about 14% with a swelling of about 2%.

Sample 4

Sample 4 was prepared as disclosed in example 2, except that the lateral faces were treated with a water repellent agent (Scotchgard™ 3M).

After the complete curing of the two coating layer and of the water repellent agent, the sample was dipped in water (20° C.) for 72 hours. The water absorption was about 14% with a swelling of about 0%.

Sample 5

Sample 4 was prepared as disclosed in example 1, except that the lateral faces were treated with a water repellent agent (Scotchgard™ 3M).

After the complete curing of the two coating layer and of the water repellent agent, the sample was dipped in water (20° C.) for 72 hours. The water absorption was about 15% with a swelling of about 0-2%.

Sample 6

Sample 6 was prepared as disclosed in example 2, except that before the coating of the rear and front faces with the composition 7 of Table 1, the lateral faces as well as the edges of the front and rear faces were treated with a water repellent agent. After the complete curing of the two coating layer and of the water repellent agent, the sample was dipped in water (20° C.) for 72 hours. The water absorption was about 14% with a swelling of about 0-2%.

Sample 7

Sample 7 was prepared as disclosed for sample 3, except that thereafter the hardened layer was further coated with a water repellent agent (scotchgard).

After the complete curing of the two coating layer and of the water repellent agent, the sample was dipped in water (20° C.) for 72 hours. The water absorption was about 15% with a swelling of about 0-2%.

Sample 8

Sample 8 was prepared as disclosed for sample 3, except that before applying the hardened layer of composition 7, all the faces of the sample were coated with a water repellent agent (scotchgard).

After the complete curing of the two coating layer and of the water repellent agent, the sample was dipped in water (20° C.) for 72 hours. The water absorption was about 15% with a swelling of about 0-2%.

The water absorption and swelling tests was repeated with oriented strand board. The conclusions of the samples 1 to 8 were maintained.

The composition Product 6 (see table 8) was applied on a face of a polyethylene web of 200 g/m$^2$. After hardening of the composition, a flexible film layer was obtained.

The composition 8 was poured so as to produce samples for being tested according to the standards BS EN ISO 1716 and ASTMD2015. The maximum amount of heat that the sample can release under highly idealized conditions was determined in an oxygen bomb calorimeter using adiabatic and isothermal methods. This test determines the maximum total heat release of the material after complete combustion, i.e. the difference between the gross heat of combustion and the residual heat after 2 hours of combustion. A gross heat of combustion of 85 KJ/Kg was determined, meaning that the product is considered as an extremely non combustible materials (M0).

Mechanical tests were also performed on the sample according to the NBN EN 196-1 standards. It was determined that the product had the following properties modulus of rupture 15.5 MPa, compressive strength 30-40 MPa, young's modulus 2200-4500 MPa.

The water capillary porosity was of about 13-14% (ASTM C948-81).

Similarly, the compositions Product n° 10, 13 and 16 (table 8) were applied on a face of the polyethylene web with a weight of 200 g/m$^2$, so as to prepare a heat resistant film having a total weight varying from 250 g/m$^2$ up to 700 g/m$^2$ (250, 300, 400, 500 and 700 g/m$^2$).

Further coated web and fabrics have been coated with the compositions Product n° 6, 10, 13 and 16 (Table 8). The web and fabrics were: basalt fabric with a weight of 100 g/m$^2$, 200 g/m$^2$, 300 g/m$^2$, glass fabric with a weight 100 g/m$^2$, 200 g/m$^2$ and 300 g/m$^2$, glass fiber web with a weight of 250 g/m$^2$. The total weight of the coated fabrics or webs were 400 g/m$^2$ and 500 g/m$^2$.

It has been seen that by adding some penetrating agent(s), it was possible to have a better inflow of the composition into the back side of the fabrics, mats.

It is also obvious that the coating of the fabric or mat could be made on both sides, for example by dipping the fabric when moving in a bath containing the composition.

It has also been shown that it was possible to have a homogeneous coating of fibers as such, by dipping glass fibers into a bath containing the coating composition, said fibers being thereafter submitted to a heat treatment for accelerating the hardening of the composition. The so coated fibers, having fire resistance properties, could be rolled onto a mandrel.

Other fibers could also be coated, such as carbon fibers, basalt fibers, nylon fibers, etc.

Fire resistance tests have been carried out on a 40 mm thick polyurethane panels provided with a glass fiber facing on both sides. PU panels were further provided on both sides with a coating of the composition of the invention, coating having after hardening a thickness of 0.4 mm (400 μm), said coating being prepared from the compositions Product n° 6, 10, 13 and 16 one week prior to the testing.

The testing was carried out according to the EN 13823 single burning test. The apparatus used for said testing is sited within a testing room of 3 m long by 3 m wide by 2.4 m high. The room incorporates an opening of dimensions 2150 mm by 1450 mm through which a trolley holding the specimen is inserted such that it locates within a free-standing frame, positioned adjacent to one wall of the test room. The frame supports a rectangular hood through which the fire effluent is drawn by means of a fan and a connecting duct system. Two windows in the enclosure enable a viewing of the specimen. The duct system has an internal diameter of 315 mm and incorporates a measurement section, positioned at the end of a 3125 mm length straight duct section comprising guide vanes for reducing air turbulence at the measurement position. This section is provided with two K-type thermocouples and one bi-directional probe connected to a differential pressure transducer. The measured temperature and the measured difference of pressure are used to calculate volume flow within the duct. The air flow rate was set at 0.6 m$^3$/s prior to the start of the test.

The gas effluent is also analyzed through a paramagnetic oxygen analyser, enabling to calculate continuously the rate of heat release by means of the oxygen consumption method. The obscuration of the light caused by the smoke in the fire effluent passing through the exhaust duct is determined by a white light lamp and a photocell system.

The single burning item specimen consists of two walls mounted into the aperture in the specimen trolley, such that they form a vertical 90° corner. The dimension of the walls are 1.5 high by 0.5 m long, and 1.5 m high by 1.0 m long.

The trolley comprises a triangular propane sand burner, positioned in the base of the corner formed by the specimen. The burner is distant from the wall by 40 mm between the edge of the burner and the lower edge of the specimen. Said burner has an output of 30 kW.

The results of said tests are:

a Fire Growth Rate Index FIGRA (W/s) of less than 150 instead of a value of more than 1500 for traditional fire resistant product.

a THR600s (MJ), i.e. the Total Heat Release over the first 10 minutes after primary burner ignition: about 4 instead of more than 6 for traditional fire resistant product.

SMOGRA or the smoke growth rate index ($m^2/s^2$) of less than about 20 instead of more than 250 for traditional fire resistant product.

TSP600s or the Total Smoke Production over the first 10 minutes after primary burner operation.($m^2$) of less than 6 instead of more than 80 for traditional fire resistant product no flaming droplets/particles within 600s The compositions Product n° 6, 10, 13 and 16 have been used for preparing matrix samples for testing procedure. It appears that the samples had gross heat of combustion is lower than 100 kJ/kg. Said compositions when mixed with fibers could enable to prepare products having a modulus of rupture of more than about 15 MPa, a compression modulus of more than 90 MPa and an Young modulus of more than 11000 MPa. Other fibers could also be coated, such as carbon fibers, basalt fibers, nylon fibers, etc.

What I claim is:

1. An inorganic binder having calcium silicate sites which are connected the one with the other by alumina-silica phosphate bonds, whereby at least a portion of the alumina-silica phosphate bonds are alumina-boron-silica phosphate bonds, the calcium silicate sites acting as cross-linking sites for the alumina-silica phosphate bonds, whereby the alumina-silicate phosphate bonds have:
   a weight ratio $Al_2O_3/SiO_2$ ranging from 0.3:1 to 10:1,
   a weight ratio $Al_2O_3/P_2O_5$ ranging from 0.0005 to 0.04, and
   a weight ratio P/B ranging from 20:1 to 100:1, and
   whereby the inorganic binder further comprises a silicon containing compound selected from the group consisting of waterproof silicon compounds, water repellent silicon compounds and mixtures thereof, the weight ratio of the silicon containing compound/P+B being comprised between 1:5000 and 1:10, and whereby at least a portion of the calcium silicate sites are at least partially coated with a layer of the silicon containing compound.

2. The binder of claim 1, in which the alumina-silica sites are bound the one to the other by alumina-boron-silica phosphate bonds.

3. The binder of claim 1, in which the weight ratio calcium silicate site/$SiO_2$ present in the alumina-silica phosphate bonds is comprised between 10 and 200.

4. The binder of claim 1, in which the calcium silicate sites are calcium meta silicate sites having an acicular nature with a length/diameter ratio from 2/1 to 50/1, the calcium meta silicate sites having an average length from 10 μm to 10 mm.

5. The binder of claim 1, in which the weight ratio calcium silicate sites/alumina-silica-boron phosphate bonds is comprised between 0.1 and 1.1, and in which calcium silicate sites are at least partially coated with a layer of the silicon containing compound.

6. A composition comprising at least:
   (a) an inorganic binder having calcium silicate sites which are connected the one with the other by alumina-silica phosphate bonds, whereby at least a portion of the alumina-silica phosphate bonds are alumina-boron-silica phosphate bonds, the calcium silicate sites acting as cross-linking sites for the alumina-silica phosphate bonds, whereby the alumina-silicate phosphate bonds have:
   a weight ratio $Al_2O_3/SiO_2$ ranging from 0.3:1 to 10:1,
   a weight ratio $Al_2O_3/P_2O_5$ ranging from 0.0005 to 0.04, and
   a weight ratio P/B ranging from 20:1 to 100:1, and
   whereby the inorganic binder further comprises a silicon containing compound selected from the group consisting of waterproof silicon compounds, water repellent silicon compounds and mixture thereof, the weight ratio the silicon containing compound/P+B being comprised between 1:5000 and 1:10, and whereby at least a portion of the calcium silicate sites are at least partially coated with a layer of the silicon containing compound, and
   (b) a silicon containing filler.

7. The composition of claim 6, in which the silicon containing filler comprises silicon containing fibers with a weight average length comprised between 25 μm and 300 μm.

8. The composition of claim 6, in which the silicon containing filler comprises silicon containing fibers, whereby after hardening and removal of free water of the composition, the composition comprises from 1% up to 85% by weight silicon containing fibers with a length of less than 500 μM, which are not reactive with the binder.

9. The composition of claim 6, which further comprises silica flour with a particle size comprised between 5 and 60 μm, the weight content of the silica flour in the composition after its hardening and after removal of the free water being comprised between 1 and 10%.

10. The composition of claim 6, which further comprises crystallized alumina silicate particles which are not reactive with the binder and which have a weight average particle size comprised between 5 and 100 μm, the weight content of the non-reactive crystallized alumina silicate in the composition after its hardening and after removal of the free water being comprised between 1 and 10%.

11. A product comprising a support having at least one face at least partly coated with a composition according to anyone of the claims 6 to 10 comprising at least:
   (a) an inorganic binder having calcium silicate sites which are connected the one with the other by alumina-silica phosphate bonds, whereby at least a portion of the alumina-silica phosphate bonds are alumina-boron-silica phosphate bonds, the calcium silicate sites acting as cross-linking sites for the alumina-silica phosphate bonds, whereby the alumina-silicate phosphate bonds have:
   a weight ratio $Al_2O_3/SiO_2$ ranging from 0.3:1 to 10:1,
   a weight ratio $Al_2O_3/P_2O_5$ ranging from 0.0005 to 0.04, and
   a weight ratio P/B ranging from 20:1 to 100:1, and
   whereby the inorganic binder further comprises a silicon containing compound selected from the group consisting of waterproof silicon compounds, water repellent silicon compounds and mixture thereof, the weight ratio the silicon containing compound/P+B being comprised between 1:5000 and 1:10, and whereby at least a portion of the calcium silicate sites are at least partially coated with a layer of the silicon containing compound, and (b) a silicon containing filler.

12. The product of claim 11, in which the support is a glass fabric with a weight from 50 g/m² to 500 g/m², at least one face thereof being at least partly coated with a layer of the composition, the layer having an average thickness comprised between 50 µm and 250 µm.

13. The binder of claim 1, whereby the binder is the reaction product obtained by reacting
an acid alumina-silica-boron phosphate solution having a pH of less than 2, the acid alumina-silica phosphate solution having:
a weight ratio $Al_2O_3/SiO_2$ ranging from 0.3:1 and 10:1,
a weight ratio $Al_2O_3/P_2O_5$ ranging from 0.0005 to 0.04, and
a weight boron content such that the weight ration P/B is comprised from 20:1 to 100:1,
with an amount of calcium silicate particles such that the weight ratio calcium silicate site/$SiO_2$ present in the alumina-silica phosphate bonds is comprised between 10 and 200,
a silicon containing compound selected from the group consisting of waterproof silicon containing compounds, water repellent silicon containing compounds and mixture thereof, such that the weight ratio the silicon containing compound/P+B being comprised between 1:5000 and 1:10.

14. The composition of claim 6, whereby the binder is the reaction product obtained by reacting
an acid alumina-silica-boron phosphate solution having a pH of less than 2, the acid alumina-silica phosphate solution having:
a weight ratio $Al_2O_3/SiO_2$ ranging from 0.3:1 and 10:1,
a weight ratio $Al_2O_3/P_2O_5$ ranging from 0.0005 to 0.04, and
a weight boron content such that the weight ratioP/B is comprised from 20:1 to 100:1,
with an amount of calcium silicate particles such that the weight ratio calcium silicate site/$SiO_2$ present in the alumina-silica phosphate bonds is comprised between 10 and 200, and
a silicon containing compound selected from the group consisting of waterproof silicon containing compounds, water repellent silicon containing compounds and mixture thereof, such that the weight ratio of the silicon containing compound/P+B being comprised between 1:5000 and 1:10,
whereby the reaction is carried out in presence of at least one silicon containing filler.

15. The binder of claim 1, in which the alumina-silicate phosphate bonds have:
a weight ratio $Al_2O_3/SiO_2$ ranging from 0.4:1 to 6:1,
a weight ratio $Al_2O_3/P_2O_5$ ranging from 0.0008 to 0.03, and
a weight ratio P/B ranging from 21:1 to 50:1, and
whereby the inorganic binder further comprises a silicon containing compound selected from the group consisting of waterproof silicon compounds, water repellent silicon compounds and mixture thereof, the weight ratio of the silicon containing compound/P+B being comprised between 1:1000 and 1:25, and whereby at least a portion of the calcium silicate sites are at least partially coated with a layer of the silicon containing compound.

16. A process for the preparation of an inorganic binder having calcium silicate sites which are connected the one with the other by alumina-silica phosphate bonds, the calcium silicate sites acting as cross-linking sites for the alumina-silica phosphate bonds with a weight ratio $Al_2O_3/SiO_2$ ranging from 0.3:1 and 10:1,
in which water insoluble calcium silicate particles partially coated with a layer of a silicon containing compound selected from the group consisting of waterproof silicon containing compounds, water repellent silicon containing compounds and mixtures thereof, are mixed with an acid alumina-silica phosphate solution comprising boric acid and a silicon containing compound selected from the group consisting of waterproof silicon containing compounds, water repellent silicon containing compounds and mixtures thereof, at a temperature lower than 70° C., the acid alumina-silica phosphate solution comprising solubilized $SiO_2$ and having a pH of less than 2, the acid alumina-silica phosphate solution having:
a weight ratio $Al_2O_3/SiO_2$ ranging from 0.3:1 and 10:1,
a weight ratio $Al_2O_3/P_2O_5$ ranging from 0.0005 to 0.04, and
a weight boron content such that the weight ration P/B is comprised from 20:1 to 100:1, and the acid alumina-silica phosphate comprising an amount of the silicon containing compound such that the weight ratio of the silicon containing compound/P+B is comprised between 1:500 and 1:75, and whereby at least a portion of the calcium silicate sites are at least partially coated with a layer of the silicon containing compound.

17. The process of claim 16, in which at least one filler is added to a composition selected from the group consisting of the binder before its hardening, the acid alumina-silica phosphate solution and the calcium silicate to be reacted with the acid alumina-silica-phosphate solution.

18. The process of claim 16, in which the hardening of the binder is carried out at a temperature comprised between 0° C. and 50° C.

19. The process of claim 16, in which the binder is hardened under pressure.

20. The process of claim 16, in which the amount of calcium silicate added to the acid silica alumina phosphate solution is such that the weight ratio calcium silicate/$SiO_2$ present in the acid solution is comprised between 1 and 500.

21. The process of claim 16, in which the acid silica alumina phosphate solution is prepared by mixing a silica-alumina mixture with an acid mixture consisting essentially of phosphoric acid and boric acid, with a weight ratio P/B ranging from 20:1 to 100:1.

22. The process of claim 16, in which the acid silica alumina phosphate solution is prepared by mixing a silica-alumina mixture with a boron salt and an acid selected from the group consisting of phosphoric acid and a mix of phosphoric acid and boric acid, whereby the weight ratio P/B of the so prepared acid alumina phosphate solution ranges from 20:1 to 100:1.

23. The process of claim 16, in which the acid silica alumina phosphate solution is prepared by mixing silica particles with an acid consisting essentially of phosphoric acid or of a mixture of phosphoric acid and boric acid so as to form an acid silica phosphate solution, and by mixing thereafter alumina particles with the acid silica phosphate solution.

* * * * *